(12) United States Patent
Groot et al.

(10) Patent No.: US 9,714,797 B2
(45) Date of Patent: Jul. 25, 2017

(54) SYSTEM FOR CHARACTERIZING MOTION OF AN INDIVIDUAL, NOTABLY A HUMAN INDIVIDUAL, AND ASSOCIATED METHOD

(71) Applicant: Thales Nederland B.V., Hengelo (NL)

(72) Inventors: Stephan Groot, Delft (NL); Ronny Harmanny, Delft (NL); Hans Driessen, Goor (NL)

(73) Assignee: THALES NEDERLAND B.V., Hengelo (NL)

( * ) Notice: Subject to any disclaimer, the term of this patent is extended or adjusted under 35 U.S.C. 154(b) by 468 days.

(21) Appl. No.: 14/352,130

(22) PCT Filed: Oct. 31, 2012

(86) PCT No.: PCT/EP2012/071623
§ 371 (c)(1),
(2) Date: Apr. 16, 2014

(87) PCT Pub. No.: WO2013/064571
PCT Pub. Date: May 10, 2013

(65) Prior Publication Data
US 2014/0261887 A1 Sep. 18, 2014

(30) Foreign Application Priority Data
Nov. 3, 2011 (EP) .................................. 11187766

(51) Int. Cl.
*G01S 13/56* (2006.01)
*F28F 9/00* (2006.01)
(Continued)

(52) U.S. Cl.
CPC ............... *F28F 9/00* (2013.01); *G01S 7/415* (2013.01); *G01S 13/04* (2013.01); *G01S 13/56* (2013.01); *G01S 13/886* (2013.01)

(58) Field of Classification Search
CPC ............. G01S 7/415; G01S 13/32; F28F 9/00
(Continued)

(56) References Cited

U.S. PATENT DOCUMENTS 8,884,813 B2 * 11/2014 Bangera ...................... 340/573.1
9,019,149 B2 * 4/2015 Bangera ........................ 342/176
(Continued)

OTHER PUBLICATIONS

M. B. Guldogan, F. Gustafsson, U. Orguner, S. Bjorklund, H. Petersson and A. Nezirovic, "Human gait parameter estimation based on micro-doppler signatures using particle filters," 2011 IEEE International Conference on Acoustics, Speech and Signal Processing (ICASSP), Prague, 2011, pp. 5940-5943.*

(Continued)

*Primary Examiner* — Marcus Windrich
(74) *Attorney, Agent, or Firm* — Snell & Wilmer L.L.P.

(57) ABSTRACT

System (1) for characterizing motion of at least one individual forming a target, comprising a radar emitting electromagnetic signals towards the target and receiving echoed signals, output as radar data, preprocessing means (11) receiving radar data as input and outputting a spectrogram representing time variations of the Doppler spectrum of the radar data, characterizing means (13) configured for outputting a probability density estimation of the state of a target, state means a vector of properties from a target, referred to as state vector, the system being characterized in that said state vector comprises at least one discrete target gait classification variable determining one target gait model among a set of determined target gait models, and a set of discrete and/or continuous motion parameters, the characterizing means comprising estimation means estimating the probability density of said state vector from said spectrogram.

15 Claims, 5 Drawing Sheets

(51) Int. Cl.
*G01S 7/41* (2006.01)
*G01S 13/04* (2006.01)
*G01S 13/88* (2006.01)

(58) Field of Classification Search
USPC .......................................... 342/28, 90, 175
See application file for complete search history.

(56) References Cited

U.S. PATENT DOCUMENTS

| | | | | |
|---|---|---|---|---|
| 9,024,814 | B2* | 5/2015 | Bangera | G06Q 30/02 340/573.1 |
| 2006/0195050 | A1* | 8/2006 | Alwan | A61B 5/1038 600/595 |
| 2010/0321229 | A1* | 12/2010 | Dwelly | G01S 7/415 342/28 |
| 2013/0005280 | A1* | 1/2013 | Leung | G01S 7/023 455/90.1 |

OTHER PUBLICATIONS

Michael Otero; Application of a continuous wave radar for human gait recognition. Proc. SPIE 5809, Signal Processing, Sensor Fusion, and Target Recognition XIV, 538 (May 31, 2005).*

Boulic, R., Thalmann, N.M. & Thalmann, D. The Visual Computer (1990) 6: 344. doi:10.1007/BF01901021.*

Guldogan M. B et al: "Human gait parameter estimation based on micro-doppler signatures using particle filters" Acoustics, Speech and Signal Processing (ICASSP), 2011 IEEE International Conference, May 22, 2011, pp. 5940-5943.

Groen FCA: "Feature-based human motion parameter estimation with radar", IET Radar, Sonar and Navigation, vol. 2, No. 2, Apr. 10, 2008, pp. 136-145.

Van Dorp P et al: "Human walking estimation with radar", IEE Proceedings: Radar, Sonar & Navigation, Institution of Electrical Engineers, GB, vol. 150, No. 5, Oct. 2, 2003, pp. 356-365.

Du L et al: "Doppler spectrogram analysis of human gait via iterative adaptive approach", The Institution of Engineering and Technology, Journal, vol. 45, No. 3, Jan. 29, 2009, pp. 186-188.

Bastien, Lyonnet et al: "Human gait classification using microDoppler time-frequency signal representations", Radar Conference, 2010, IEEE, May 10, 2010, pp. 915-919.

Raj R.G. et al: "Analysis of radar human gait signatures", IET Signal Processing, vol. 4, No. 3, Jun. 18, 2010, pp. 234-244.

International Search Report and Written Opinion for PCT/EP2012/071623 dated Jan. 17, 2013.

* cited by examiner

SYSTEM FOR CHARACTERIZING MOTION OF AN INDIVIDUAL, NOTABLY A HUMAN INDIVIDUAL, AND ASSOCIATED METHOD

CROSS-REFERENCE TO RELATED APPLICATIONS

This application is a U.S. national phase filing under 35 U.S.C. §371 of PCT/EP2012/071623 filed Oct. 31, 2012 and claims priority from Application No. 11187766.8 which was filed on Nov. 3, 2011, all of which are incorporated herein by reference in their entirety.

The current invention relates to a system for characterizing motion of an individual, notably a human individual, and associated method. The current invention particularly relates to automatic detection, tracking and surveillance systems of human individuals, and more precisely on those of these system which use at least radar means.

The automatic detection of human individuals is an essential goal in many applications of security and surveillance systems. Such an automatic processing may first be essential, notably due to the fact human operators often cannot handle the immense amount of sensor data in surveillance systems. Indeed, many security and surveillance systems comprise a large amount, in the order of a few hundreds, of Closed Circuit TeleVision cameras, usually referred to by the acronym "CCTV", which have to be monitored by human operators. The operators are usually unable to simultaneously watch all the images appearing in front of them, due to the large number of monitors. Furthermore, a human operator is easily subject to boredom and fatigue. As a consequence, surveillance video is often used for post-analysis, rather than realtime detection and analysis of human individuals.

Secondly, automatic processing allows different types of sensor data to be used for further analysis of the detected person. Automatic detection, for example, can be followed by the automatic tracking of a person entering a secure area. Another example is intent analysis, where a measure of hostility, for example, is linked to a detected person, discharging the operator even more from his surveillance duties.

For the detection of human individuals, a lot of different sensors of different types, such as acoustic, seismic, visual, infrared sensors and radar devices, have been used. Compared to most of the other types of sensors, radar devices have some substantial advantages for the purpose of detecting human individuals. In effect, many security and surveillance applications require avoiding the placement of cameras or seismic sensors for instance, in the area of observations, because of high security risks. A radar has the advantage that it can function at a distance from potential targets. Moreover a radar has also the advantage of being able to properly function during day and night, as well as under virtually all weather conditions.

One known drawback of using a radar, is that no visual image of the target can be obtained therefrom, in contrast with electro-optical measurements, for example obtained with a camera, which can be directly displayed to the human operator. Because different sensors complement disadvantages of the others, it is usually convenient to use a combination of more than one sensor for the purpose of detecting human individuals, such techniques being often referred to as sensor fusion techniques.

For a long time, a majority of radar-based systems for human motion analysis have been using different spectral processing techniques. However, the main disadvantage of spectral-based methods is the unreliable distinction between human motion and motion of other nature, for example motion of animals or issuing from low-frequency oscillations.

More recently, the spectrogram, which is a time-varying representation of the spectrum of the radar signal, has emerged. Human motion leaves a characteristic signature in the spectrogram. Therefore, the information from the spectrogram is highly suitable to make a distinction between human motion and motion from other sources. Making use of the spectrogram still yields several approaches for the analysis of human motion. Based on the spectrogram two different approaches are possible: a feature-based approach and a model-based approach.

The feature-based approach makes use of local features, that are extracted from the spectrogram and those features are then tracked in each measurement of the sequence. Typically, the velocities of the leg and torso can be extracted from the spectrogram. These features are then, together with an approximation of the trajectories of these body parts, filtered by filtering means, for example a Kalman Filter or a particle filter, to estimate some global walking parameters, like velocity and step length. Other features that can be extracted from the spectrogram and used for human motion analysis are for example size, gender and walking speed.

The advantage of the feature-based method is that this approach allows fast computations. However, one drawback of this method lies in that it is difficult to find features providing a good correspondence with human motion. Moreover, the feature-based approach only estimates the phases of the different extracted body parts.

Using the model-based approach, the error between simulated data produced from a model and measured data can be minimized by adjusting the input parameters of the model. Different models estimating the parameters of human walking have been designed, such as the models known as Boulic and Thalmann models, these models being based upon step frequency and walking velocity learnt from statistical measurements.

However, the known approaches that are based on the use of spectrograms, merely focus on estimating human motion parameters, using models that are merely describing the walking gait of humans.

One aim of the current invention is to palliate at least the above mentioned drawbacks that are inherent to existing techniques, by proposing a system for real-time characterizing motion of individuals, for example human individuals, based upon exploiting the spectrogram issued from radar data, for determining not only motion parameters, but also for the purpose of classifying the gait of the detected individual, the determined gait class being preferably used for selecting the most appropriate model for describing the individual's motion parameters. It is therefore one specificity of the current invention, to use the spectrogram for jointly identifying human motion and estimating the motion parameters.

One other advantage of the current invention according to any of its described embodiments, is that it can be implemented through systems involving low-cost sensors, having a low power consumption.

For that purpose, the current invention proposes a system for characterizing motion of at least one individual forming a target, comprising:
  a radar emitting electromagnetic signals towards the target and receiving echoed signals, output as radar data as a function of time, preprocessing means receiving radar data as input and outputting a spectrogram representing time variations of the Doppler spectrum of the radar data from which a single Doppler spectrum at a time instant of measurement is referred to as a measurement, characterizing means configured for outputting a probability density estimation of the state of a target, the system being characterized in that said state is described by a state vector which comprises at least one target gait classification variable and a set of motion parameters, the characterizing means comprising estimation means estimating the probability density of said state vector for each received said measurement.

In a preferred embodiment, said state vector can comprise a target gait classification variable representing a target gait class, whose value is belonging to a set of as many discrete values as different typical gait models.

In a preferred embodiment, the gait models can comprise a first gait model, a second gait model and a third gait model, the first gait model being modeling a walking human individual, the second gait model being modeling a running human individual, and the third gait model being modeling a null-hypothesis corresponding to motion of another object or no motion.

In a preferred embodiment, the radar can be a Continuous Wave radar.

In a preferred embodiment, the radar can be a Frequency Modulated Continuous Wave radar.

Figure 1:
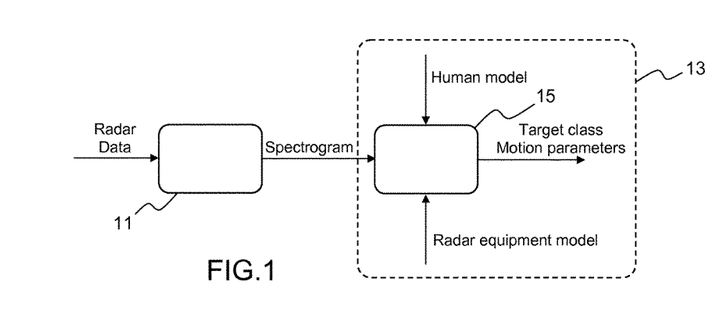
FIG. 1, a diagram illustrating, in a synoptic manner, a system for characterizing motion of an individual, according to an embodiment of the current invention.

These and other characteristics and advantages of the invention will be made clearer in view of the detailed description given below of a preferred embodiment, provided by way of an illustrative and non-limiting example only, as well as the accompanying drawings which represent:

FIG. 1 shows a diagram illustrating, in a synoptic manner, a system for characterizing motion of an individual, according to an embodiment of the invention.

A system 1 can comprise preprocessing means 11 receiving input data delivered by a radar, not illustrated on the figure. The radar emits pulses of electromagnetic signals towards a target, for example formed by a human individual, and receives echoed pulses, output as so-called radar data.

The preprocessing means 11 allows outputting a spectrogram representing time variations of the Doppler spectrum of the radar data. More details on how the preprocessing means 11 operate are described further below.

The spectrogram is then forwarded to the input of a characterizing means 13 depicted in the figure by a dotted line. The characterizing means 13 can comprise filtering means 15, for example formed by a particle filter, configured for determining a state vector representing the detected target, based upon the input spectrogram, and on the knowledge of at least a human model and at least a radar equipment model. More details on how the particle filter is operating are described further below.

One specificity of the current invention is that the spectrogram is used for the purpose of determining not only motion parameters, but also for the purpose of classifying the gait of the detected individual.

Since individual human body parts, like the legs, torso and arms, do not move with constant velocity, they induce micro-Doppler signatures. According to the current invention, time-varying micro-Doppler signatures, forming so-called spectrograms, contain information that can be used to detect human individuals and to classify the type of gait of the detected individual. These signatures can even be used for example to identify persons or specific behaviors, based on the personalized features of their signatures, for example compared to signatures stored in dedicated databases.

The current invention choses a model-based approach. It first proposes to detect human motion, by allowing making a classification between different types of human gaits on one hand and motion originated from other sources on the other hand. According to the current invention, it is proposed that two different types of human motion are considered: walking and running. Other types of motion can be caused by for example animals or vehicles, and can require a different action than the presence of a human.

Then, when human motion is successfully detected, the current invention allows estimating three motion parameters, for example by making an estimation of the average walking or running velocity and the height of the person. Since human walking and running is a periodic movement in which the limbs form a specific coordinated motion, one can define a value to indicate in which part of the gait cycle the target is at that time. This value is often referred to as the phase in the gait cycle and is also estimated as part of the current invention. On one hand a proper comparison of the spectra at one specific time instant is performed. On the other hand this can give valuable information about behavior of body parts, for example if the considered individual is swinging with his arms or not.

The current invention also proposes that a particle filter be resorted to, taking a spectrogram as input to classify between human and other motions.

In the following, theoretical background on particle filtering is given, with a focus on using particle filters for the purpose of the current invention. Then further details are given on the models used for modelling human walking and running. Then, more details are given on the particle filter implementation for the analysis of human motion.

The classification of targets based on the information obtained from the time-varying Doppler spectra is a state estimation problem. In state estimation problems, the state of a dynamic system is estimated recursively using a sequence of noisy measurements made on that system.

In the Bayesian approach to state estimation one attempts to construct the posterior Probability Density Function, usually referred to by the acronym "pdf", of the state based on all available information, including all the measurements received up to that time instant. A recursive filter can be used to estimate this posterior pdf of the state, since a new estimate is required every time a new measurement comes available. In order to make an analysis about a dynamic system at least two models are required.

The first model involved in state estimation is the system model $f_k$. The system model describes the evolution of the state with time. Consider the evolution of the state sequence $\{x_k, k \in N\}$, which is given by the following relation:

$$x_k = f_k(x_{k-1}, v_{k-1}) \quad (1).$$

Where $f_k : R^{n_x} \times R^{n_v} \to R^{n_x}$ is a function of the state $x_{k-1}$, $\{v_{k-1}, k \in N\}$ is an independent and identically distributed (i.i.d.) process noise sequence, $n_x$, $n_v$ are dimensions of the state vector and process noise vector respectively, N is the set of natural numbers and R is the set of real numbers.

Second, a measurement model is required, which gives the relation between the noisy measurement and the state variables. This measurement model models the relationship between the underlying physical process and the received radar signals. The objective is to recursively estimate $x_k$ from measurements formulated by the following relation:

$$z_k = h_k(x_k, n_k) \quad (2),$$

Where $h_k : R^{n_x} \times R^{n_n} \to R^{n_z}$ is a possibly non-linear function, $\{n_k, k \in N\}$ is an i.i.d. measurement noise sequence, and $n_z$, $n_n$ are dimensions of the measurement and measurement noise vectors respectively. More specifically, the purpose is to obtain filtered estimates of $x_k$ based on all available measurements up to that time. From a Bayesian perspective, one can state that it is required to construct the pdf $(x_k|z_{1:k})$, where $z_{1:k}$ denotes the set of all available measurements up to time k. It is assumed that the initial pdf $p(x_0|z_0) \equiv p(x_0)$ of the state vector is available. Then, in principle, the pdf $p(x_k|z_{1:k})$ can be obtained, recursively, in two stages: a stage of prediction and a stage of update.

In the prediction stage the system model described in the relation (1), expressed above, is used to predict the state pdf $p(x_k|z_{k-1})$. It is supposed that the required pdf $p(x_{k-1}|z_{1:k-1})$ at time k−1 is available.

To predict the pdf of the state at time k, the Chapman-Kolmogorov equation can be used:

$$p(x_k|z_{1:k-1}) = \int p(x_k|x_{k-1})p(x_{k-1}|z_{1:k-1})dx_{k-1} \quad (3).$$

The probabilistic model of the state evolution $p(x_k|x_{k-1})$ is defined by the system model from relation (1) and the known statistics of $V_{k-1}$.

When at time instant k a new measurement becomes available, this information is used to update the prior estimate, via Bayes' rule, which can be formulated by the following relation:

$$p(x_k|z_{1:k}) = \frac{p(z_k|x_k)p(x_k|z_{1:k-1})}{p(z_k|z_{1:k-1})} \quad (4)$$

where the normalizing constant, formulated by the following relation:

$$p(z_k|z_{1:k-1}) = \int p(z_k|x_k)p(x_k|z_{1:k-1})dx_k \quad (5)$$

depends on the likelihood function $p(z_k|x_k)$ defined by the measurement model, as indicated in relation (2) above, and the known statistics of $n_k$. In the update stage of relation (4) above, the measurement $z_k$ is used to modify the prior density to obtain the required posterior density of the current state.

The recurrence relations from previous relations (3) and (4) form the basis for the Bayesian solution. Solutions do only exist in a restrictive number of cases, referred to as optimal solutions.

When the solution cannot be determined analytically, approximations to the optimal solution can be obtained through an appropriate method. Different methods can be resorted to, for instance: Kalman filters or a grid-based method.

According to a preferred embodiment of the current invention, it is proposed that the approximations of the optimal solution be obtained by means of a particle filter.

Particle filtering is a technique allowing implementing a recursive Bayesian filter by so-called Monte Carlo (MC) simulations. The main principle is to represent the required posterior density by a set of random samples, in the context of a particle filter also referred to as particles, with associated weights and to compute estimates based on these samples and weights.

Assuming a set of random samples $\{x_{k-1}^i, i=1, \ldots, N_S\}$ drawn from the pdf $p(x_{k-1}|z_{k-1})$ is given. The particle filter basically propagates and updates these samples to obtain a set of samples $\{x_k^i, i=1, \ldots, N_S\}$, which are approximately distributed according to $p(x_k|z_k)$.

This can be done through two basic steps: a prediction step and an update step.

In the prediction step, each sample is passed through the system model $f_k$ to predict samples for time step k based on the samples from the previous time step. This prediction step can also be described by the following relation:

$$\tilde{x}_k^i = f_k(x_{k-1}^i, v_k^i), \text{for } i=1, \ldots, N_s \quad (6),$$

where $=\{\tilde{x}_k^i, i=1, \ldots, N_S\}$ denotes the predicted samples or particles, for each i $v_k^i$ is a sample drawn from the pdf of the system noise process $v_k$ and $N_s$ represents the number of samples.

When at time k a new measurement $z_k$ becomes available, for each sample a normalized weight is obtained based on the likelihood of that sample, which can be formulated by the following relation:

$$w^i = \frac{p(z_k|\tilde{x}_k^i)}{\sum_{j=1}^{N_s} p(z|\tilde{x}_k^j)}, \quad (7)$$

where $w^i$ denotes the weight of particle i.

Thanks to the particle filter, no restrictions are placed on either the system model $f_k$ as the measurement model $h_k$, nor on the distributions of the system or measurement noise.

The only requirements are:
$p(x_0)$ shall be available for sampling;
the likelihood function $p(z_k|x_k)$ shall be a known functional form;
$p(v_k)$ shall be available for sampling The particle filter can thus be implemented through the particle filter implementing process described below, comprising the following steps of:

Requiring $\lfloor \{x_{k-1}^i, w_{k-1}^i\}_{i=1}^{N_s}, z_k \rfloor$;
Ensuring $\lfloor \{x_k^i, w_k^i\}_{i=1}^{N_s} \rfloor$;
For i varying from 1 to $N_s$:
  Drawing $x_k^i \sim p(x_k|x_{k-1})$,
  Calculating $w_k^i = p(z_k|x_k^i)$;

Calculating total weight:

$$t = \sum_{i=1}^{N_s} w_k^i;$$

For i varying from 1 to $N_s$:
  Normalizing $w_k^i = t^{-1} w_k^i$
Resampling using the resampling process described hereafter.

This process can be implemented by means of appropriate means, for example implemented through dedicated hardware components, or through pieces of software run by a dedicated computer and associated hardware.

When the variance of the weights increases over time, this leads to a so-called degeneracy problem. This means that after a number of iterations, all but one particles has negligible normalized weights. This basically means that a large computational effort is devoted to updating particles of which the contribution to the approximation of $p(x_k|z_k)$ is almost zero.

One possible way to overcome the degeneracy problem is to resample the particles. Resampling eliminates samples with low weights and multiplies samples with high weights.

This can be done by creating a new set $\{x_k^{i*}\}_{i=1}^{N_s}$ by taking samples from an approximate discrete representation of $p(x_k|z_{1:k})$. The resulting sample is in fact an i.i.d. sample from this discrete density, and therefore the weights are reset to $w_k^i = 1/N_s$.

The resampling process can be implemented through the resampling process described below, comprising the following steps of:
  Requiring $\lfloor \{x_k^i, w_k^i\}_{i=1}^{N_s} \rfloor$;
  Ensuring $\lfloor \{x_k^{j*}, w_k^j\}_{j=1}^{N_s} \rfloor$;
    Initializing the Cumulative Distribution Function (CDF): $c_1 = 0$;
    For i varying from 2 to $N_s$:
      Construct CDF: $c_i = c_{i-1} + w_k^i$;
    Start at the bottom of the CDF i=1;
    Draw a starting point: $u_1 \sim U[0, N_s^{-1}]$;
    For j varying from 1 to $N_s$:
      Move along the CDF: $u_j = u_1 + N_s^{-1}(j-1)$;
      While $u_j > c_i$: increment i by 1: i=i+1;
      Assign sample: $x_k^{j*} = x_k^i$;
      Assign weight: $w_k^j = N_s^{-1}$;
      Assign parent: $i^j = i$.

This process can be implemented by means of appropriate means, for example implemented through dedicated hardware components, or through pieces of software run by a dedicated computer and associated hardware.

In the classification of human motion, based on the information in the spectrogram, highly non-linear phenomena are involved. The underlying physical process of the human motion, the radar equipment model and the transformation from the radar time signal to the spectrogram all contain non-linear elements. Some suboptimal solutions may also be looked into, such as the use of Extended Kalman Filters, usually referred to by the acronym "EKF", or Unscented Kalman Filters, usually referred to as "UKF", bearing a poorer performance when the non-linearity is very severe. Also, a grid-based method could be looked into.

The classification of human motion can be interpreted as a state estimation problem with different modes of operation, based on the target class. These types of problems can be referred to as jump Markov or hybrid-state estimation problems, involving both a continuous-valued target state and a discrete-valued mode variable. The continuous state variables include the walking velocity and the phase of the gait cycle, while the discrete mode variable indicates the different target class and corresponding models. For the different discrete modes, different physical processes link the continuous state variables to the measured spectra. These physical processes are for example a walking human or a running human, but also the modeling of the motion from other origins. For the purpose of the current invention, the implementation of the particle filter involves the addition of a discrete state variable, to switch between the models of different modes.

As it is introduced further above, the spectrogram is analyzed with a model-based approach. The chosen models for a walking and a running human are presented hereafter.

Human walking is a complex motion of swinging arms and legs. Walking is a periodic activity, in which one single gait cycle is defined as the successive contacts of the heel of the same foot, i.e. one step from both the left and the right legs. During a single gait cycle each leg undergoes two phases. In the stance phase the corresponding foot is on the ground. The stance phase occupies approximately 60% of the gait cycle. In the swing phase the foot is lifted from the ground with an acceleration or deceleration.

Thalmann developed a model for human walking based on empirical mathematical parameterizations derived from experimental data. The influence of personalized motion is minimized through averaging the parameters from the experimental data.

The Thalmann model consists of two aspects. The first aspect relates to the kinetics of the modeled body parts, hence describing the time-varying positions of the body during a gait cycle. The second aspect models the size and shape of the body parts of a human. Both aspects are treated separately in the remainder of this section.

The Thalmann model provides positions and orientations for the walking human body during a gait cycle. The motion is described by 12 trajectories. These trajectories consist of 3 translations and 14 rotations, of which 5 are duplicated for both sides of the body. A list of the body trajectories of the Thalmann model is provided in the table below:

| Trajectory | Translation | Body rotation | Left rotation | Right rotation |
|---|---|---|---|---|
| Vertical translation | $T_V(t_R)$ | | | |
| Lateral translation | $T_L(t_R)$ | | | |
| Translation forward/backward | $T_{F/B}(t_R)$ | | | |
| Rotation forward/backward | | $\theta_{F/B}(t_R)$ | | |
| Rotation left/right | | $\theta_{L/R}(t_R)$ | | |
| Torsion rotation | | $\theta_{TO}(t_R)$ | | |
| Flexing at the hip | | | $\theta_H(t_R)$ | $\theta_H(t_R + 0.5)$ |
| Flexing at the knee | | | $\theta_K(t_R)$ | $\theta_K(t_R + 0.5)$ |
| Flexing at the ankle | | | $\theta_A(t_R)$ | $\theta_A(t_R + 0.5)$ |
| Motion of the thorax | | $\theta_{TH}(t_R)$ | | |
| Flexing at the shoulder | | | $\theta_S(t_R)$ | $\theta_S(t_R + 0.5)$ |
| Flexing at the elbow | | | $\theta_E(t_R)$ | $\theta_E(t_R + 0.5)$ |

Flexing shall be understood as either the bending of a joint or the movement by muscular control.

All the trajectories are dependent on the walking velocity. The model takes as input a so-called relative walking velocity $v_{rel}$ in m/s, which is the average walking velocity $v_{av}$ normalized by a dimensionless value equal to the height of the leg $H_t$:

$$v_{rel} = \frac{v_{av}}{H_t}. \quad (8)$$

The height of the leg $H_t$ can be expressed in terms of the total height h of the person as follows:

$$H_t = 0.491 \cdot h \quad (9).$$

Some exemplary average walking velocities, for different relative velocities and different heights are given in the table below. Typical relative velocities for a walking human range between just above 0 m/s and 3 m/s.

|  | h (m) | | |
| --- | --- | --- | --- |
|  | 1.7 | 1.8 | 1.9 |
|  | | $H_t$ (m) | |
|  | 0.83 | 0.88 | 0.93 |
| $v_{rel}$ (m/s) | | $V_{av}$ (m/s) | |
| 0.5 | 0.42 | 0.44 | 0.47 |
| 1.0 | 0.83 | 0.88 | 0.93 |
| 1.5 | 1.25 | 1.33 | 1.40 |
| 2.0 | 1.67 | 1.77 | 1.87 |
| 2.5 | 2.09 | 2.21 | 2.33 |
| 3.0 | 2.50 | 2.65 | 2.80 |

One important aspect of the Thalmann model is the empirical relationship between the relative velocity $v_{rel}$ and the cycle length of a normal walking person, which can be formulated by the following relation:

$$R_C = 1.3461\sqrt{v_{rel}} \quad (10),$$

where $R_C$ is the cycle length in meters. Two other parameters of the Thalmann model are related to the time scaling. The time duration of a cycle can be defined as the ratio between the cycle length RC and the relative velocity $v_{rel}$:

$$T_C = \frac{R_C}{v_{rel}}. \quad (11)$$

Finally, a normalized time is introduced by normalizing the time by a dimensionless value of $T_C$:

$$t_R = \frac{t}{T_C}, \quad (12)$$

where $t_R$ is the normalized time in seconds.

All the three translational trajectories can be described by sinusoidal expressions. The three translational trajectories are:

1. Vertical translation: this models the vertical offset of the center of the spine from the height of the spine. The translation is given by the following relation:

$$T_v(t_R) = -a_v + a_v \sin[2\pi(2t_R - 0.35)] \quad (13),$$

with $a_v = 0.0015 v_{rel}$.

2. Lateral translation: is a lateral oscillation of the center of the spine and is given by the following relation:

$$T_L(t_R) = a_l \sin[2\pi(t_r - 0.1)] \quad (14),$$

where:

$$a_l = \begin{cases} -0.128 v_{rel}^2 + 0.128 v_{rel} & \text{if } v_{rel} < 0.5 \\ -0.032 & \text{if } v_{rel} > 0.5. \end{cases} \quad (15)$$

3. Translation forward/backward (horizontal): this models the acceleration of the body when beginning a new step and stabilizing the leg:

$$T_{F/B}(t_R) = a_{F/D} \sin[2\pi(2t_R + 2\phi_{F/B})] \quad (16),$$

where:

$$a_{F/B} = \begin{cases} -0.084 v_{rel}^2 + 0.084 v_{rel} & \text{if } v_{rel} < 0.5 \\ -0.021 & \text{if } v_{rel} > 0.5. \end{cases} \quad (17)$$

and $\phi_{F/B} = 0.625 - T_S$. The quantity $T_S$ indicates the time of support, that is: the time when one of the feet is on the ground, and can be determined from the cycle time $T_C$ from $T_S = 0.752 T_C - 0.143$.

Figure 2A:
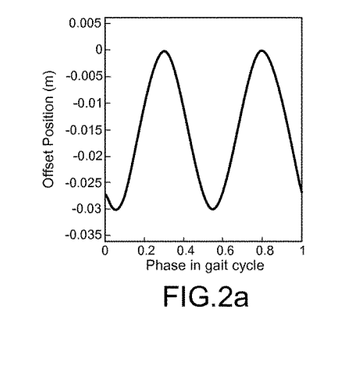
FIGS. 2a to 2c, typical curves representing translational trajectories within the context of a walking human motion model according to an embodiment of the invention.
Figure 2B:
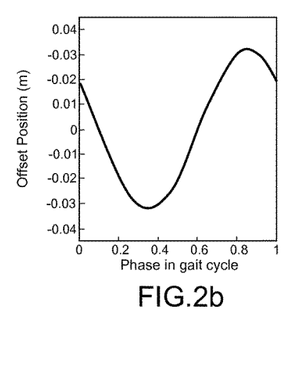
Figure 2C:
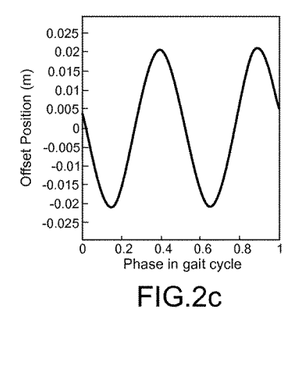

The shapes of these three translations are respectively represented in FIGS. 2a to 2c.

Three of the rotation trajectories are also described by either sinusoidal or piecewise sinusoidal functions, as follows:

1. Rotation forward/backward: a flexing1 movement of the back of the body relative to the pelvis before each step, to make a forward motion of the leg:

$$Ro_{F/B}(t_R) = ar_{F/B} + ar_{F/B} \sin[2\pi(2t_R - 0.1)] \quad (18),$$

where:

$$ar_{F/B} = \begin{cases} -8 v_{rel}^2 + 8 v_{rel} & \text{if } v_{rel} < 0.5 \\ 2 & \text{if } v_{rel} > 0.5. \end{cases} \quad (19)$$

2. Rotation left/right: this piecewise function models the flexing movement that makes the pelvis fall on the side of the swinging leg:

$$Ro_{L/R} = \quad (20)$$
$$\begin{cases} -ar_{L/R} + ar_{L/R} \cos[2\pi(10 t_R/3)] & \text{if } 0 \leq t_R < 0.15 \\ -ar_{L/R} - ar_{L/R} \cos[2\pi(10(t_R - 0.15)/7)] & \text{if } 0.15 \leq t_R < 0.5 \\ -ar_{L/R} - ar_{L/R} \cos[2\pi(10(t_R - 0.5)/3)] & \text{if } 0.5 \leq t_R < 0.65 \\ -ar_{L/R} + ar_{L/R} \cos[2\pi(10(t_R - 0.65)/7)] & \text{if } 0.65 \leq t_R < 1, \end{cases}$$

where $ar_{L/R} = 1.66 v_{rel}$.

3. Torsion rotation: the pelvis rotation relative to the spine to make a step can be expressed by the following relation:

$$Ro_{Tor} = ar_{Tor} \cos(2\pi t_R) \quad (21),$$

where $ar_{Tor} = 4 v_{rel}$.

Figure 3A:
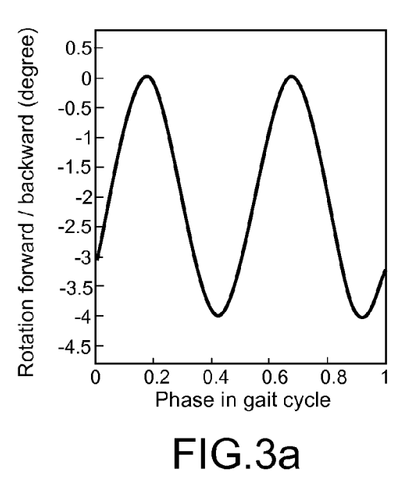
FIGS. 3a to 3c, typical curves representing rotational trajectories within the context of a walking human motion model according to an embodiment of the invention.
Figure 3B:
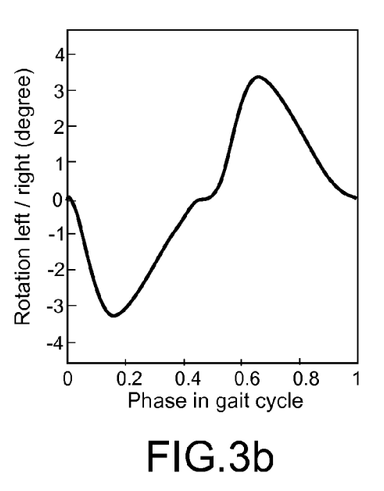
Figure 3C:
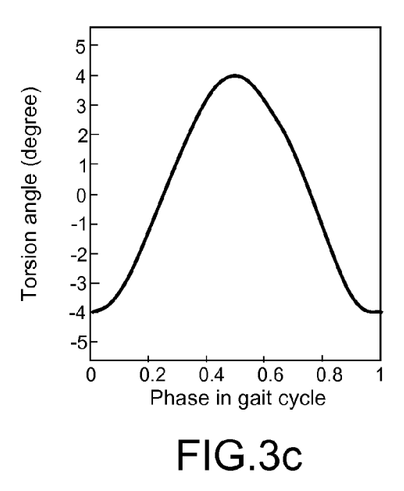
Figure 4A:
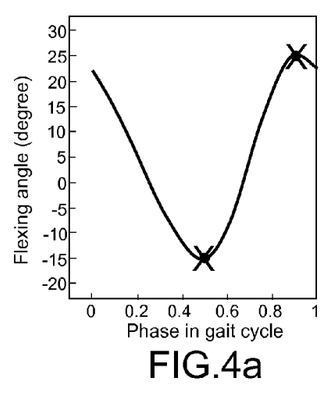
FIGS. 4a to 4f, typical curves representing rotational trajectories within the context of a walking human motion model according to an embodiment of the invention.
Figure 4B:
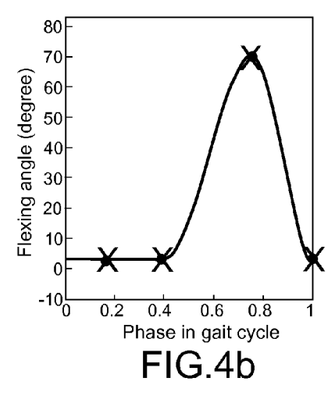
Figure 4C:
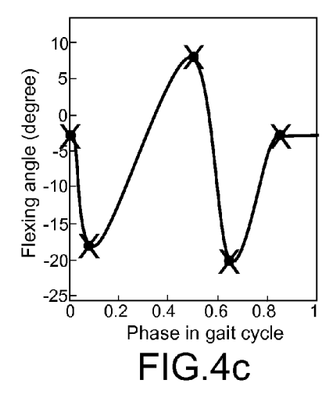
Figure 4D:
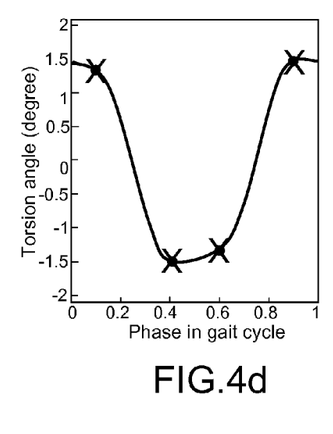
Figure 4E:
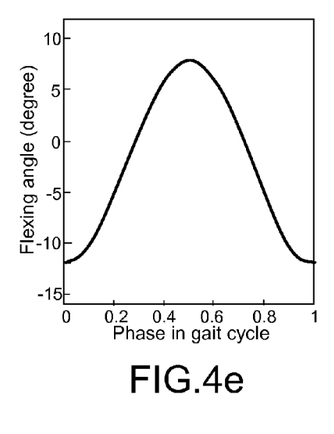
Figure 4F:
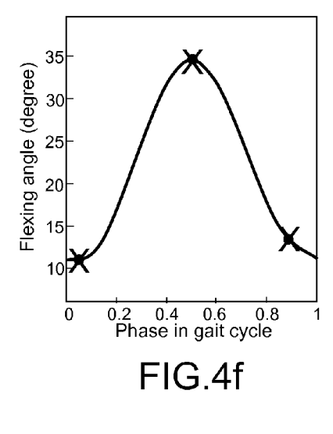

The shapes of these three rotations are respectively represented in FIGS. 3a to 3c. The last six rotational trajectories are represented by cubic spline functions passing through control points located at the extremities of these trajectories. FIGS. 4a to 4f illustrate these trajectories, together with their corresponding control points, represented by crosses on the figures.

Figure 5:
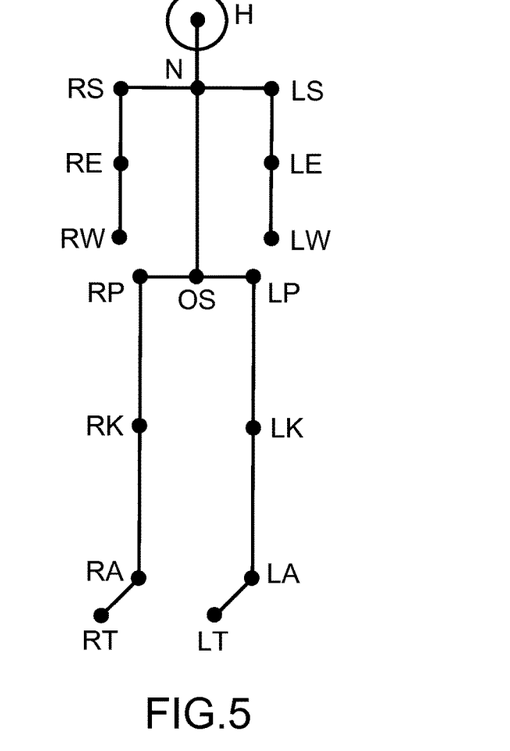
FIG. 5, in a synoptic manner, a human body model with reference interconnection points, according to an embodiment of the invention.

The trajectories of Thalmann model can be used to describe the location of 17 reference points. These reference points are illustrated by FIG. 5.

The 17 reference points are the head H, the neck N, the origin of the spine OS, the left and right shoulders LS, RS, elbows LE, RE, wrists LW, RW, pelvis LP, RP, knees LK, HK, ankles LA, RA and toes LT, RT.

These 17 reference points are used as the interconnection points of 14 body parts. These body parts are listed in the table below, as well as their respective sizes with respect to the total height of the human individual.

| Body part | Connected by joints | Size |
|---|---|---|
| Head | Head (H) | 0.130 h |
| Torso | Neck (N) - Origine of spine (OS) | 0.288 h |
| Right upper arm | Right shoulder (RS) - Right elbow (RE) | 0.188 h |
| Right lower arm | Right elbow (RE) - Right wrist (RW) | 0.145 h |
| Left upper arm | Left shoulder (LS) - Left elbow (LE) | 0.188 h |
| Left lower arm | Left elbow (LE) - Left wrist (LW) | 0.145 h |
| Left hip | Origin of spine (OS) - Left pelvis (LP) | 0.010 h |
| Right hip | Origin of spine (OS) - Right pelvis (RP) | 0.010 h |
| Right upper leg | Right pelvis (RP) - Right knee (RK) | 0.245 h |
| Right lower leg | Left pelvis (LP) - Left knee (LK) | 0.246 h |
| Right foot | Right ankle (RA) - Right toe (RT) | 0.039 h |
| Left upper leg | Left pelvis (LP) - Left knee (LK) | 0.245 h |
| Left lower leg | Left knee (LK) - Left ankle (LA) | 0.246 h |
| Left foot | Left ankle (LA) - Left toe (LT) | 0.039 h |

The shape of the body parts can be modeled as ellipsoids, except for the head which is more similar to a sphere.

Now, as far as human running is concerned, the current invention proposes to resort to another model, described hereafter.

There exist some fundamental differences between a walking human and a running human. First of all, compared with human walking, the stance phase is shortened, which means that the swing phase is lengthened. Secondly, there is no time of double support, which means that there is no time in the gait cycle where both feet are on the ground. Finally, a new phase is introduced: the non-support phase. In this phase neither legs are weight bearing, which can be regarded as a double float period.

The kinematic behavior of 40 points of a human has been characterized by Vignaud. From performed measurements, the radial velocity as a function of the average running velocity $v_{av}$ and the time can be modeled.

Figure 6:
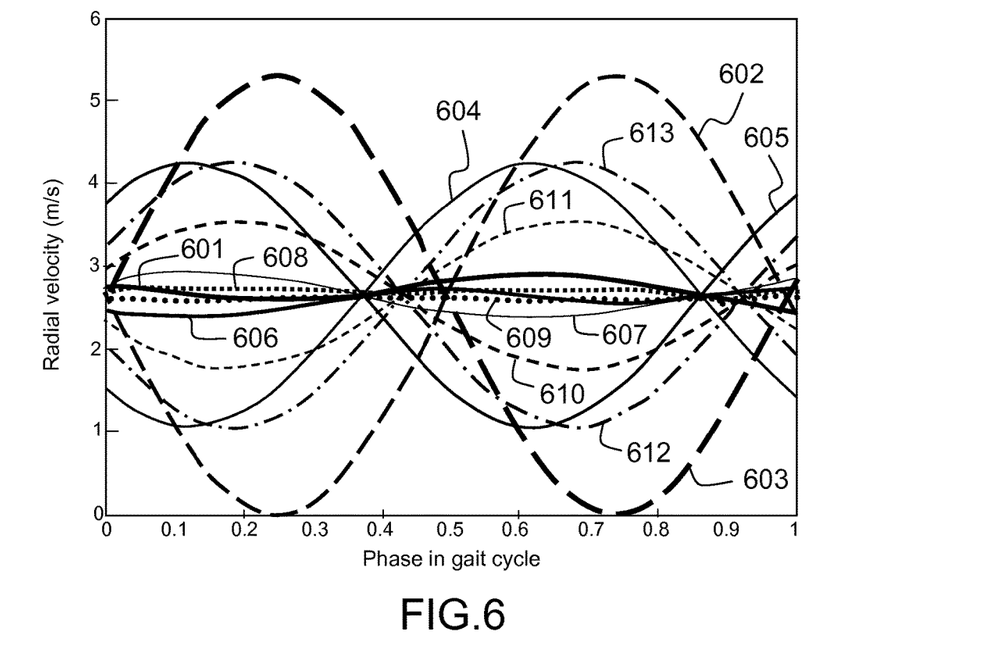
FIG. 6, a typical set of curves representing the radial velocities of human body parts as a function of phase in gait cycle, within the context of a running human model according to an embodiment of the invention.

According to a specificity of the current invention, in order to use the same model for the size and shape of the body parts as for a walking human, the same 17 reference points as in the Thalmann model presented above are selected out of the 40 points available. Their respective radial velocities as a function of the phase in gait cycle are illustrated by curves in FIG. 6. In FIG. 6, a first curve 601 relates to the torso, a second curve 602 relates to the left foot, a third curve 603 relates to the right foot, a fourth curve 604 relates to the left knee, a fifth curve 605 relates to the right knee, a sixth curve 606 relates to the left hip, a seventh curve 607 relates to the right hip, an eighth curve 608 relates to the left shoulder, a ninth curve 609 relates to the right shoulder, a tenth curve 610 relates to the left elbow, an eleventh curve 611 relates to the right elbow, a twelfth curve 612 relates to the left hand, and a thirteenth curve 613 relates to the right hand.

Some more details are now given on the particle filter implementation for the analysis of human motion.

It is proposed that the current invention be based on the model known as Thalmann model for human walking, and the model known as Vignaud model for running human. Both models require the same three input parameters:

the relative velocity $v_{rel}$ in m/s, which is a scaled version of the average velocity by a dimensionless value equal to the height of the thigh of the person, as indicated in relation (8) above;

the height h of the person in m;

the phase of the gait cycle $\phi_{gc}$, which is a dimensionless value between 0 and 1.

These three input parameters are equal to the motion parameters that need to be estimated. As proposed by the current invention, the state vector, hereinafter referred to as $x_k$, comprises at least a mode variable m which represents the target gait class. The mode variable m may have different discrete values, each corresponding to the hypothesis of a given typical target gait class. The state vector can also comprise other parameters related to the motion of the target. The choice of the other motion parameters is determined by the choice of the appropriate models of typical human gaits, described above.

For example, the state vector $x_k$ can be formulated as follows:

$$x_k = \begin{pmatrix} m \\ v_{rel} \\ h \\ \varphi_{gc} \end{pmatrix}, \quad (22)$$

where: $v_{rel}$ is the relative velocity of the target, for example in m/s, which is a scaled version of the average velocity by a dimensionless value, for example equal to the height of the thigh of the detected individual forming the target; h is the height of the detected individual, in meters, $\phi_{gc}$ is the phase of the gait cycle of the individual, which is a dimensionless value, for example comprised between 0 and 1. In the relation (22) above, k denotes the discrete time. m can be belonging to a set T comprising the discrete values, for example integers 0, 1 and 2. Each integer of the set T corresponds to one of the hypotheses corresponding to a plurality of different classes, three in this example, for example the following three classes:

$H_0$: a so-called null-hypothesis, used for a motion of other origin than a human individual, and for an absence of motion, $H_1$: a hypothesis for a walking human individual, $H_2$: a hypothesis for a running human individual.

From the estimated posterior pdf the likelihood of each hypothesis can be estimated, as mentioned above, the required posterior density can be represented by a set of random samples, in the context of a particle filter also referred to as particles, with associated weights and to compute estimates based on these samples and weights.

The remainder of the problem formulation focuses on the two different models required for a particle filter implementation. In the following, first the system model is presented, followed by an explanation of the measurement model.

In a particle filter, the system model gives the relation between the state variables at the next time step k+1 and the current time k. For the state vector $x_k$, presented in relation (22) above, this relation is given by:

$$x_{k+1} = x_k + \begin{pmatrix} 0 \\ 0 \\ 0 \\ \frac{\Delta t}{T_C} \end{pmatrix} + v_k, \quad (23)$$

where $\Delta t$ is the time between two successive discrete time indexes k, $T_C$ is the time duration of one gait cycle and $v_k$ represents the process noise vector. This process noise vector can be built up as formulated by the following relation:

$$v_k = \begin{pmatrix} v_m \\ v_{v_{rel}} \\ v_h \\ v_{\varphi_{gc}} \end{pmatrix}. \quad (24)$$

The different elements of the process noise vector in relation (24) above have the following meaning:

The process noise on the target class $v_m$ can be modeled as a Markov process with a transition probability matrix π. This models the possibility of a change in target class of the measurement. Such phenomena can occur for example when an individual changes his gait from walking to running or vice-versa. Another very likely occurrence of such a phenomenon is an individual who stops his/her movement or starts moving, hence going for a state of no motion to a state of either walking or running. The transition probability matrix of this process can be formulated by the following relation:

$$v_m = \prod_k \equiv \prod = \begin{pmatrix} p_{00} & p_{01} & p_{02} \\ p_{10} & p_{11} & p_{12} \\ p_{20} & p_{21} & p_{22} \end{pmatrix} = \begin{pmatrix} 0.98 & 0.01 & 0.01 \\ 0.01 & 0.98 & 0.01 \\ 0.01 & 0.01 & 0.98 \end{pmatrix} \quad (25)$$

The physical origin of the process noise on the relative velocity is the acceleration or deceleration of an individual in a certain period of time, changing the velocity of the gait.

This process noise can be given by the following relation:

$$v_{v_{rel}} = a\Delta t \quad (26).$$

A typical maximal acceleration for human motion is 2 m/s². In this case the acceleration a can be modeled as a zero-mean Gaussian process, where the three-sigma 3σ value is set equal to the same value as the typical maximal acceleration, hence ensuring that 99.8% of the Gaussian curve is within these maximal limits. The zero-mean Gaussian distribution provides a more likely distribution for no acceleration at all to a gradually decreasing probability towards the maximal acceleration. In summary, the acceleration a can be distributed according to the following relation:

$$a \sim N(a; \mu_a, \sigma_a^2) = N(a; 0, 0.44) \quad (27),$$

The process noise on the height can also be modeled as a zero-mean Gaussian process, as formulated by the following relation:

$$v_h \sim N(v_h; \mu_{v_h}, \sigma_{v_h}^2) = N(v_h; 0, 0.0025) \quad (28).$$

The last entry of the process noise models the noise on the phase in the gait cycle. For this, a uniform distribution between −0.01 and 0.01 can be chosen, as given by the following relation:

$$v_{\varphi_{gc}} \sim U(-0.01, 0.01) \quad (29).$$

The measurement model $h_k$ from relation (2) above gives the relation between the state variables and the spectrogram. This measurement model $h_k$ is used for the translation from the variables of a state vector $x_k$ to an estimated spectrum $\tilde{s}(t_{meas}, v_r)$.

In the current invention, the measured data are the traces from the spectrogram, which can be denoted $s(t_{meas}, v_r)$, where $v_r$ is the radial velocity in m/s and $t_{meas}$ indicates the measurement time in seconds.

This process comprises several steps and has to be performed for each particle. This process is illustrated in a synoptic manner by FIG. 7.

Figure 7:
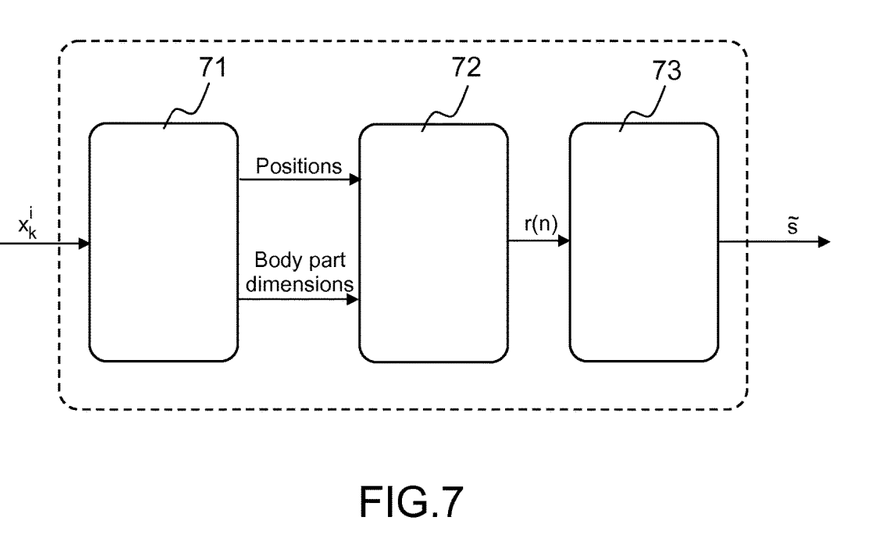
FIG. 7, a block diagram depicting a schematic overview of a measurement model, according to an embodiment of the invention.

In a first step 71, the state variables of the state vector $x_k^i$ are used to determine the kinematic positions of the 17 joints based on either the Thalmann model or the Vignaud model. Next, these positions are used in combination with the modeled human body part dimensions, to model a received radar signal r(n) in a second step 72. Finally, the radar signal r(n) is converted to an estimated spectrum $\tilde{s}$ in a third step 73. The three steps 71, 72, 73 are described in detail hereafter. These three steps 71, 72, 73 can be implemented by means of appropriate means, for example implemented through dedicated hardware components, or through pieces of software run by a dedicated computer and associated hardware.

First Step 71 of Estimating Kinematic Positions

For a purpose of clarity of the description, it can be assumed that the human moves in the radial direction of the radar and is moving away from the radar. Hence, all the measured velocities correspond with the actual velocities of the body parts, since these are the radial velocities. In preferred embodiments of the invention, the angle under which the individual moves can be taken into account in the state vector.

A second assumption can be made, according to which at $t_{meas}=0$ the initial position of the individual with respect to the radar is known. In the first step of the measurement model, the goal is to obtain the positions of the 17 joints of the kinematic model and to estimate the dimensions of the body parts. These positions are estimated for each particle, based on the state variables in the state vector $x_k^i$. The following two possibilities may occur:

1. The mode variable m of the state vector $x_k^i$ is 0, hence the null-hypothesis is assumed. In this case no positions are estimated, since no human motion is assumed;
2. The mode variable m is equal to either 1 or 2, indicating a walking or a running human, respectively. In this case, the relative velocity $v_{rel}$, the height h and the phase in the gait cycle $\varphi_{gc}$ are used as inputs of either the Thalmann model or the Vignaud model, respectively, in order to estimate the kinematic positions and dimensions of the body parts.

The measured spectrogram can be obtained by performing a Short-Time Fourier Transform, usually referred to by the acronym "STFT" on the radar video signal. A STFT consists of performing a Fourier transform on a block-by-block basis, by time-windows, rather than transforming the whole signal at once. On the contrary to a classical Fourier transform, a STFT thus contains information on how a signal's frequency contents change over time. The result of such a windowed Fourier transform can be thought of as a signal's frequency behavior during the time covered by the considered window.

A STFT can be formulated by the following relation:

$$STFT(t, \omega) = \int_{-\infty}^{+\infty} s(\tau)w(\tau - t)e^{-j\omega\tau}d\tau, \quad (30)$$

where s is the signal to be transformed and w is the windowing function. The obtained resolution in time is better, the narrower the window w is chosen, at the cost of a poorer frequency resolution. Therefore there exists a trade-off in the selection of the time and frequency resolution.

The square of the STFT is referred to as the spectrogram, which can be used to get an idea of the signal's energy distribution in the joint time-frequency domain. The spectrogram can thus be formulated by the following relation:

$$\text{Spectrogram} = |STFT(t,\omega)|^2 \quad (31).$$

Figure 8:
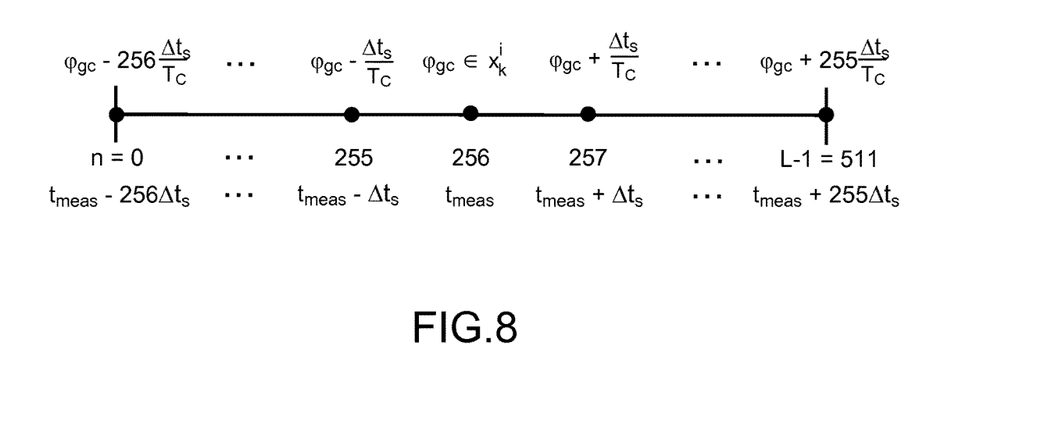
FIG. 8, a time diagram depicting set and timing details of a window used for estimating the kinematic positions, according to an embodiment of the invention.

For example, the sliding window used to convert the radar video signal to the spectrogram can have a length L of 512 samples. Therefore, to obtain an estimated spectrogram, the positions of a similar window have to be estimated. A setup of such a window is illustrated by FIG. 8. At a certain time in the spectrogram $t_{meas}$ a spectrogram trace needs to be estimated, based on the information of the state variables of that particle $x_k^i$. The phase of the gait cycle $\phi_{gc}$ can be used as the center of the window. Using the sampling frequency of the radar $f_s$, or the sampling time $\Delta t_s$, combined with the estimated duration of the gait cycle $T_C$ the other phases of window samples can be determined. For example, the sampling frequency used for the measurements can be 8820 Hz. Finally, the estimated phases of the gait cycle are used in combination with the relative velocity and height in the state vector to determine the positions.

Second Step 72 of Modelling the Radar Equipment

In the second step 72 of the measurement model the goal is to model the received radar signal, based on the estimated kinematic positions and dimensions of the human body model. The received signal can be modeled as the superposition of the return from the 14 body parts. This gives the following received signal r(n):

$$r(n) = \sum_{i=1}^{14} A_i e^{j\frac{4\pi R_i}{\lambda}} \quad (32)$$

for $$n = 0, 1, \ldots, L-1,$$

where $A_i$ indicates the received amplitude and $R_i$ the radial distance of the corresponding body part i.

In a preferred embodiment of the current invention, the radar used for the measurement can be a Continuous Wave radar, usually referred to by the acronym CW radar, which for example transmits a signal with a frequency of 24 GHz. In such an exemplary embodiment the wavelength λ is then equal to 0.125 m. The radar used for the measurement can also for example be a Frequency Modulated Continuous Wave radar, usually referred to by the acronym FMCW radar.

It is to be observed here that beside the high potential for detection, classification and identification that allows, exploiting the micro-Doppler effect introduces another advantage for surveillance and security applications. Indeed, these applications often require sensors to be low-cost and to have low power consumption. As described above, thanks to the current invention, a Continuous Wave or a Frequency Modulated Continuous Wave radar can for example be used, which is a type of sensor that fulfils such requirements, and which is besides highly suitable for measuring the Doppler velocity with the necessary accuracy.

The amplitude $A_i$ can be estimated based on the radar equation formulated by the following relation:

$$A_i = C \frac{P_{EIRP}\lambda^e \sigma_i'}{4\pi^3 R_i^4}, \quad (33)$$

where C denotes an aggregated gain of the system. This gain can be estimated by performing a calibration measurement. A typical exemplary value of this gain is 56.3 dB. The effective isotropic radiated power embodies the gain of the transmit antenna and the transmitted power and is in this exemplary case equal to −10 dBW. Finally, the Radar Cross Section, usually referred to by the acronym RCS, of each body part a can be estimated by using the RCS model for an ellipsoid. The scattering amplitude and phase of an ellipsoid is given by the following relation:

$$\sqrt{\sigma_i} = \frac{R_e^2 \frac{1}{2} H_e \sqrt{\pi}}{(R_e \sin(\theta_e))^2 + \left(\frac{1}{2}H_e\cos(\theta_e)\right)^2} e^{j\frac{2\pi}{\lambda} r_i}, \quad (34)$$

where $R_e$ is the radius of ellipsoid in meters, $H_e$ is the height of the ellipsoid in meters, θ is the angle with the height axis and r, is the distance between the radar and the centre of the ellipsoid. The phase shift is an approximation. As an example, the RCS for the body parts of a human with a height of 1.8 m are given in the table below:

| Body part | $R_e$ (m) | $H_e$ (m) | σ (m²) |
|---|---|---|---|
| Head | 0.1 | 0.23 | 3.66 · 10⁻² |
| Torso | 0.15 | 0.52 | 10.8 · 10⁻² |
| Upper arm | 0.06 | 0.34 | 1.56 · 10⁻² |
| Lower arm | 0.05 | 0.27 | 1.12 · 10⁻² |
| Hip | 0.07 | 0.17 | 1.89 · 10⁻² |
| Upper leg | 0.07 | 1.96 | 0.16 · 10⁻² |
| Lower leg | 0.06 | 1.24 | 0.08 · 10⁻² |
| Foot | 0.05 | 0.26 | 1.14 · 10⁻² |

The scattering amplitude and phase in the relation (34) above give the time average of the RCS.

In practical applications, the RCS varies in time due to for example weather conditions and variations of the RCS of the body itself by different clothing and bending of the body parts. The fluctuation models of Swerling describe different RCS fluctuation in time.

Within the context of the current invention, the Swerling model V can be used, which assumes a constant RCS throughout the measurement.

Third Step 73 of Converting the Received Radar Signal to an Estimated Spectrum The third step 73, as illustrated in FIG. 7, of the measurement model converts the received radar signal to an estimated spectrum $\tilde{s}(t,v_r)$. First, in the example introduced above, the 512-sample long time signal r(n) can be windowed with a Hanning window w(n). Then, a Fast Fourier Transform, usually referred to by the acronym FFT, can be performed to obtain the spectrum, as formulated by the relation below:

$$\tilde{s}(t,v_r)=F(w \cdot x) \quad (35).$$

The aforementioned explanation for the estimation of the spectrum holds for the hypotheses for a walking and a running human. A different approach can be used to estimate the spectrum in case of the null-hypothesis. The spectrum of the null-hypothesis can be modeled as a Gaussian spectrum around the zero-Doppler velocity, and as noise for the other velocities. The applicant has indeed perform several tests and simulations, according to which different traces corresponding to different walking animals present similarities with a Gaussian shape around the zero-Doppler velocity. For higher velocities the spectrum mainly consists of noise.

Also, clutter can be in most cases be modeled as a cardinal sinus function or "sinc" function with its center at zero-Doppler. The center part of a sinc-function has a similar shape to a Gaussian spectrum and therefore the spectrum of clutter, i.e. no motion, can be adequately approximated by a Gaussian shape.

The current invention therefore proposes to model the null-hypothesis as a Gaussian spectrum with different distributed center frequencies $v_{center;null}$, widths $\sigma_{null}^2$, amplitudes $A_{null}$ and offsets $s_{0;null}$, as formulated by the following relation:

$$\tilde{s} = A_{null}\exp\left\{-\frac{(v-v_{center;null})^2}{2\sigma_{null}^2}\right\} + s_{0;null}. \quad (36)$$

The different parameters of the null-hypothesis can be chosen to have the following distributions (the letter U representing a uniform distribution):

$A_{null} \sim U(1,400]^{-1}$, which is similar to an amplitude between −52 dB and 0 dB;

$v_{center;null} \sim U[0,1)$;

$\sigma_{null}^2 \sim U[0,0.5)$;

$s_{0;null} \sim U[0,1)$ and can be chosen in such a way to approximate the spectra of both different animals and clutter.

More details on implementing a particle filter as per the current invention are provided below.

As previously described, one of the requirements of a particle filter implementation is that the initial distribution of the state variables $p(x_0)$ is available for sampling. These initial distributions $p(x_0)$ are used for the prediction step of the first iteration. The assumptions made for these initial distributions are described first in the following. Then, knowing the functional form of the likelihood function $p(z_k|x_k)$ is also a requirement for a particle filter implementation. The derivation of the likelihood function $p(z_k|x_k)$ is further described hereafter.

The following initial distribution for the different state variables can be assumed:

The mode variable m is selected with an equal probability, as indicated in the following relation:

$$p(m=0)=p(m=1)=p(m=2)=1/3 \quad (37).$$

The relative velocity $v_{rel}$ follows an uniform distribution between 0 m/s and 5 m/s:

$$p(v_{rel})=U[0,5) \quad (38).$$

The height of the individual follows a Gaussian distribution with a mean $\mu_h$ of 1.7 m and a variance $\sigma_h^2$ of 0.07 m:

$$p(h)=N(h;\mu_h,\sigma_h^2)=N(h;1.7,0.07) \quad (39).$$

The phase is selected from an uniform distribution between 0 and 1:

$$p(\phi_{gc})=U(0,1] \quad (40).$$

The derivation of the likelihood function $p(z_k|x_k)$ is now described. The likelihood function is used to assign weights to the particles. As described further above, an estimated spectrum $\tilde{s}$ is determined for each particle. The relation between the measured spectrum s and the estimated spectrum $\tilde{s}$ can be formulated as follows:

$$s=\tilde{s}+n \quad (41),$$

where n is an i.i.d. measurement noise process, that follows a zero-mean complex-normal distribution (denoted by the letters "CN" below) with a variance $\sigma_n^2$:

$$p(n_i)=CN(n_i;0,\sigma_n^2) \quad (42).$$

Both vectors have the same length, which corresponds to the number of Doppler bins $N_{bins}$.

Assuming that for each Doppler bin the error between the measured spectrum $s_i$ and the estimated spectrum $\tilde{s}_i$ is a i.i.d. variable and follows a zero-mean normal distribution with a variance $\sigma_n^2$, this results in the following likelihood function:

$$p(s|\tilde{s}) = \prod_{i=1}^{N_{bins}}\left\{\exp\left[-\frac{1}{2}\left(\frac{(s_i-\tilde{s}_i)}{\sigma_n}\right)^2\right]\frac{1}{\sqrt{2\pi\sigma_n^2}}\right\}. \quad (43)$$

Maximizing the likelihood of the equation formulated in relation (43) above is equivalent to maximizing its logarithm, or minimizing the negative of its logarithm. Therefore the maximum likelihood can be obtained when the expression formulated below is minimized:

$$\left[\sum_{i=1}^{N_{bins}}\frac{(s_i-\tilde{s}_i)^2}{2\sigma_n^2}\right] - N_{bins}\log\frac{1}{\sqrt{2\pi\sigma_n^2}}. \quad (44)$$

Hence, the expression of relation (44) above has its minimum when for all Doppler bins hold $s_i=\tilde{s}_i$, that is when the estimated spectrum is equal to the measured spectrum.

Since N and σ in relation (44) above are constant, minimizing this expression is equivalent to minimizing the following expression:

$$\sum_{i=1}^{N_{bins}}(s_i-\tilde{s}_i)^2 = \sum_{i=1}^{N_{bins}}\varepsilon_i, \quad (45)$$

which corresponds a least-squares fit. In this relation an error ε is introduced, which is equal to the least-squares difference of each Doppler bin. This least-squares fit is a maximum likelihood estimator for independent and normally distributed estimation errors with constant variance. This maximum likelihood estimator can be used to assign a weight to the particles. From the relation (45) above it can be seen that maximum likelihood is obtained when the error for each Doppler bin is minimized. Therefore for a small error, the estimated spectrum $\tilde{s}$ should be assigned a higher weight and vice versa. The inverse of the error signal can be used to assign weights to the particles, as formulated by the relation below:

$$w^j = \frac{1}{\sum_{i=1}^{N_{bins}} \varepsilon_i} = \frac{1}{\sum_{i=1}^{N_{bins}} (s_i - \tilde{s}_i)^2} \quad (46)$$

for $j = 1, 2, \ldots, N_s.$

The initial distributions of the state variables and the function to assign weight to the particles, provided in relation (46) allow fully implementing the particle filter.

It is to be observed that though the examples described above relate to characterizing motion of human individuals, the current invention can apply to characterizing motion of individuals, the term "individual" being to be understood as in its broadest acception. In other words, the current invention can notably also apply to characterizing motion of animals, insofar as appropriate animal gait models are being resorted to.

The invention claimed is:

1. A system for characterizing motion of at least one individual forming a target, comprising:
   a radar for emitting electromagnetic signals towards the target and receiving echoed signals, said radar being configured to output radar data as a function of time,
   preprocessing means for receiving radar data as input and outputting a spectrogram representing time variations of the Doppler spectrum of the radar data from which a single Doppler spectrum at a time instant of measurement being referred to as a measurement,
   a filter configured to output a probability density estimation of the state of the target,
   wherein said state is described by a state vector which comprises at least one target gait classification variable and a set of motion parameters, wherein said filter is configured to recursively estimate the probability density of said state vector for each received measurement, from a first function defining the evolution of the state with time, and from a second function defining the relation between a noisy measurement and said state variables.

2. The system of claim 1, wherein said state vector comprises a target gait classification variable (m) representing a target gait class, whose value is belonging to a set of as many discrete values as different typical gait models.

3. The system of claim 1, wherein said motion parameters are the relative velocity $v_{rel}$, which is a scaled version of the average velocity by a dimensionless value equal to the height of the thigh of the individual, the height h of the individual and the phase of the gait cycle $\phi_{gc}$ of the individual, which is a dimensionless value between 0 and 1.

4. The system of claim 2, wherein the gait models comprise a first gait model, a second gait model and a third gait model, the first gait model modeling a walking human individual, the second gait model modeling a running human individual, and the third gait model modeling a null-hypothesis corresponding to motion of another object or no motion.

5. The system of claim 4, wherein the first gait model is a walking human model of Thalmann type, describing motion through 12 trajectories and 17 body reference points, as a function of relative velocity $v_{rel}$ and a normalized time $t_R$ defined as the ratio between time t and the time duration $T_C$ of a gait cycle, defined as the ratio between a gait cycle length $R_C$ and the relative velocity $v_{rel}$.

6. The system of claim 5, wherein the second gait model is a running human model describing motion through said 17 body reference points and their respective, radial velocities as a function of the phase in gait cycle $\phi_{gc}$.

7. The system of claim 4, wherein the null-hypothesis is modeled by a Gaussian spectrum with determined distributed center frequencies $v_{center,null}$, widths $\sigma_{null}^2$, amplitudes $A_{null}$ and offsets $s_{0,null}$.

8. The system of claim 1, wherein the radar is of the Continuous Wave type.

9. The system of claim 1, wherein the radar is of the Frequency Modulated Continuous Wave type.

10. The system of claim 1, wherein the radar is a pulsed radar.

11. The system of claim 1, wherein said estimation means are formed by a particle filter.

12. The system of claim 11, wherein the particle filter is implemented through assigning weights $w^j$ to a number $N_S$ of particles as per the following relation:

$$w^j = \frac{1}{\sum_{i=1}^{N_{bins}} \varepsilon_i} = \frac{1}{\sum_{i=1}^{N_{bins}} (s_i - \tilde{s}_i)^2} \text{ for } j = 1, 2, \ldots, N_s;$$

where $N_{bins}$ denotes a number of Doppler bins, $s_i$ and $\tilde{s}_i$ respectively denote the measured spectrum and the estimated spectrum for a given Doppler bin i, and $\varepsilon_i$ denotes the least-squares difference of each Doppler bin i.

13. A system for characterizing motion of at least one individual forming a target, comprising:
   a radar emitting electromagnetic signals towards the target and receiving echoed signals, said radar outputting radar data as a function of time,
   preprocessing means receiving radar data and outputting a spectrogram representing time variations of the Doppler spectrum of the radar data, a single Doppler spectrum at a time instant of measurement being referred to as a measurement,
   characterizing means configured to output a probability density estimation of the state of a target,
   wherein said state is described by a state vector which comprises at least one target gait classification variable and a set of motion parameters, the characterizing means comprising a filter, said filter being configured to recursively estimate the probability density of said state vector for each received said measurement, using a system model according to which the state variables of the state vector at a next time step k+1 is a function of the state variables of the state vector at a current time step k and of a process noise vector.

14. The system ac of claim 13, wherein the estimation means are formed by a particle filter and the system model is given by the relation:

$$x_{k+1} = x_k + \begin{pmatrix} 0 \\ 0 \\ 0 \\ \frac{\Delta t}{T_C} \end{pmatrix} + v_k,$$

where $\Delta t$ is the time between two successive discrete time indexes k, $T_C$ is the time duration of one gait cycle and $v_k$ represents a process noise vector.

15. The system of claim 14, wherein the process noise vector $v_k$ is built up as formulated by the following relation:

$$v_k = \begin{pmatrix} v_m \\ v_{v_{rel}} \\ v_h \\ v_{\varphi_{gc}} \end{pmatrix},$$

where $v_m$ is the process noise on the target class and is modeled as a Markov process with a transition probability matrix $\pi$; $v_{v_{rel}}$ is the process noise on the target relative velocity and is given by the relation $v_{v_{rel}} = a\Delta t$; $v_h$ is the process noise on the height is modeled as a zero-mean Gaussian process, $v_{\varphi_{gc}}$ is the process noise on the phase in the gait cycle, and is a uniform distribution between −0.01 and 0.01.

* * * * *